United States Patent [19]

Goodman et al.

[11] 4,417,547

[45] Nov. 29, 1983

[54] ENGINE SPEED AND ENGINE LOAD RESPONSIVE FLUID INJECTION SYSTEM FOR AN INTERNAL COMBUSTION ENGINE

[75] Inventors: Toronta P. Goodman, Summit Point, W. Va.; Bruce W. Everling, Fairfax, Va.

[73] Assignee: Goodman System Company, Inc., Armonk, N.Y.

[21] Appl. No.: 322,194

[22] Filed: Nov. 17, 1981

[51] Int. Cl.³ .......................................... F02M 25/02
[52] U.S. Cl. ................................ 123/25 J; 123/25 L; 123/25 K; 123/25 A
[58] Field of Search .................. 123/25 R, 25 A, 25 J, 123/25 K, 25 L, 25 M, 25 N, 198 A

[56] References Cited

U.S. PATENT DOCUMENTS

| | | | |
|---|---|---|---|
| 2,493,808 | 1/1950 | Garrigus | 123/25 L |
| 2,507,596 | 5/1950 | Hodgkins | 123/25 L |
| 2,835,233 | 5/1958 | Mellinger | 123/25 L |
| 3,987,774 | 10/1976 | Waag | 123/25 J |
| 4,051,815 | 10/1977 | Coberley | 123/25 A |
| 4,078,527 | 3/1978 | Yasuda | 123/25 B |
| 4,125,092 | 11/1978 | Inamura | 123/25 B |
| 4,191,134 | 3/1980 | Goodman | 123/25 J |
| 4,300,483 | 11/1981 | Goodman | 123/25 J |
| 4,300,484 | 11/1981 | Goodman | 123/25 J |
| 4,300,485 | 11/1981 | Goodman | 123/25 J |

*Primary Examiner*—Ira S. Lazarus

[57] ABSTRACT

A fluid injection system for an internal combustion engine such as a spark-ignition engine in which an injection nozzle injects a finely divided spray of fluid, such as water or a water solution, into the engine in response to a flow of atomizing air. The nozzle is connected to a fluid supply reservoir and to an air compressor for supplying air to the nozzle at a rate in direct proportion to engine speed to induce the flow of fluid through the nozzle. A pressure responsive flow control device is provided that is responsive to engine load, as manifested by the pressure in the intake manifold for controlling the flow of air to the nozzle, and therefore the discharge of fluid from the nozzle. The pressure of air supplied by the compressor to the nozzle is varied in response to variations of the pressure in the exhaust manifold of the engine. As a result, the flow of atomizing air to the nozzle, and therefore the rate of fluid injection, is varied in response to variations in engine speed and in engine load.

23 Claims, 6 Drawing Figures

ENGINE SPEED AND ENGINE LOAD RESPONSIVE FLUID INJECTION SYSTEM FOR AN INTERNAL COMBUSTION ENGINE

BACKGROUND OF THE INVENTION

The present invention relates to a system for injecting a fluid, such as water or a water solution, into an internal combustion engine and, more specifically, to a fluid injection system and method for injecting fluid into an internal combustion engine in which the injection rate is proportional to engine speed and engine load.

Various cooling fluids, such as water and water in solution with other substances, such as methanol or alcohol, have been commonly injected into hydrocarbon engines, both of the spark-ignition and compression-ignition type, to provide improved engine operation. These improvements are possible since, during the compression stroke of the engine, the water droplets evaporate and thus absorb heat and prevent pre-ignition. On the power stroke the gasoline is burned and the remaining water is turned to steam which absorbs more heat and helps prevent detonation. Also, as the water turns to steam, it undergoes considerable expansion which produces significant additional power. Further, as a result of the above, combustion occurs at lower temperatures and is more even, and the pistons and valves enjoy a longer life. Further, the presence of water also creates a "steam cleaning" process that tends to remove carbon and other deposits from the combustion chamber, as well as prevent the formation of additional deposits.

Various types of prior devices have been used to introduce cooling fluids into internal combustion engines. These devices have included nozzle-type injectors in which the fluid is pumped directly into the engine and intake air humidifiers in which air is passed through a volume of water before being introduced into the engine. However, since the injection of a relatively low volume of fluid is desired when compared to the volume of fuel introduced into the engine, it is difficult, if not impossible, to meter the fluid with the precision needed to insure optimum performance when it is pumped directly into the engine. Also, if humidified air is used, there is a reduction in power and fuel economy, since the humidified air is less dense that dry air with water droplets. Also, the use of humidified air does not permit the cooling effect caused by the evaporation of the water droplets.

These prior devices suffer from additional problems, since they are usually operated solely in response to engine speed, or by the exhaust gases from the engine, either directly or as modified by the engine intake manifold pressure. Although these techniques result in a fluid injection rate that may be adequate under certain engine operating conditions, such as a constant-speed cruise condition, the injection rate during other engine operating conditions, such as acceleration and deceleration, may be too little or too much. When the fluid injection rate is insufficient, the beneficial effects of the cooling fluid are, of course, not obtained. Conversely, when the injection rate is too high, the surplus fluid within the combustion chamber tends to quench the combustion process and, of course, diminish engine performance.

SUMMARY OF THE INVENTION

It is therefore an object of the present invention to provide a system for injecting a fluid, such as water or a water solution, into the air intake side of an internal combustion engine in response to the flow of atomizing air through a nozzle to obtain a precise metering of the injected fluid.

It is another object of the present invention to provide a fluid injection system of the above type in which the fluid is injected in response to engine speed and load.

It is still another object of the present invention to provide a fluid injection system of the above type in which a compressor is provided for introducing atomizing air to the nozzle in response to engine speed and a control device varies the air flow in response to variations in engine load.

It is still another object of the present invention to provide a fluid injection system of the above type in which the aforementioned control device controls the air flow to the nozzle in response to pressure variations in the intake manifold of the engine.

It is a still further object of the present invention to provide a fluid injection system of the above type in which the pressure of the air supplied to the above control device varies in response to pressure variations in the exhaust manifold of the engine.

It is still another object of the present invention to provide a fluid injection system of the above type which is inexpensive to manufacture and which is simple and reliable in operation.

It is a further object of the present invention to provide a fluid injection system of the above type which is easy to install on an internal combustion engine and which is ideally suited for after-market installations on previously manufactured vehicles.

Towards the fulfillment of these and other objects, the fluid injection system of the present invention includes a fluid injecting device, such as a jet nozzle, which is located on the air intake side of an engine to introduce fluid in finely divided form into the intake air of the engine. The nozzle is connected to both a supply of cooling fluid and to an air compressor which introduces air to the nozzle in response to engine speed to draw the fluid through the nozzle and into the engine. A control device is connected between the air compressor and the intake manifold to vary the flow of air to the nozzle in response to variations in pressure in the intake manifold. The air line connecting the compressor to the control device is in communication with the exhaust manifold so that the pressure of the air supplied to the control device varies in response to pressure variations in the exhaust manifold. Thus, air is introduced to the nozzle, and fluid injected from the nozzle, in response to engine speed and load.

BRIEF DESCRIPTION OF THE DRAWINGS

The above brief description as well as further objects, features and advantages of the present invention will be more fully appreciated by reference to the following detailed description of presently preferred but nonetheless illustrative embodiments in accordance with the present invention, when taken in conjunction with the accompanying drawings wherein.

DESCRIPTION OF THE PREFERRED EMBODIMENT

Figure 1:
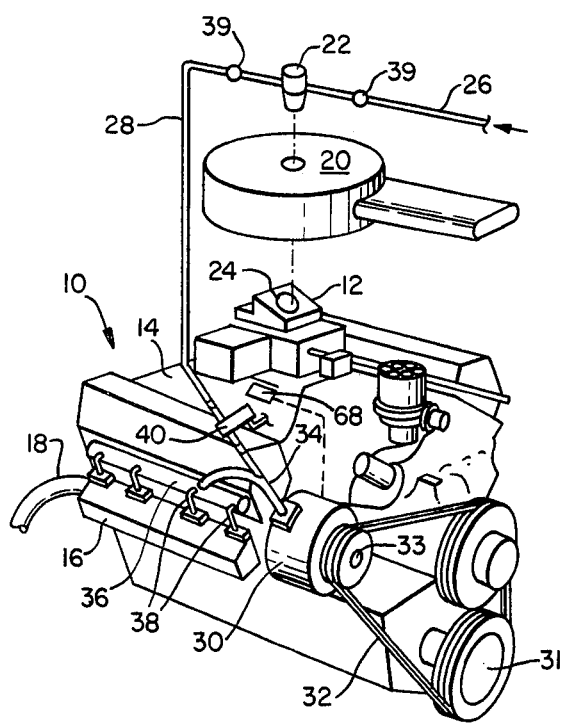
FIG. 1 is an exploded perspective view of an exemplary internal combustion engine equipped with the system of the present invention with certain components being shown schematically and with selected parts of the engine being omitted in the interest of clarity.

An examplary internal combustion engine incorporating the fluid injection system of the present invention is shown in FIG. 1 and is generally referred to by the reference numeral 10. The engine 10 is of conventional design and includes a carburetor 12 mounted on an intake manifold 14 for introducing a fuel/air charge into the combustion chamber of the engine. An exhaust manifold 16 is provided on each side of the engine for directing the exhaust gases produced during the combustion process through an exhaust system 18 (partially shown). An air cleaner, or other plenum, 20 is provided which normally is mounted over the carburetor 12 and which has an opening formed therein for receiving a fluid injection jet, or nozzle, 22 which is adapted to inject fluid, such as water or a water solution, into the intake air side of the engine 10. In the preferred embodiment, the nozzle 22 is mounted in the air cleaner 20 above an inlet opening 24 of the carburetor 12 to direct a downwardly diverging flow of finely divided fluid droplets into the intake air entering the opening 24, as will be described.

The nozzle 22 is connected to the source of fluid through a conduit 26 in a manner also to be described, and is also connected, via a conduit 28, to the outlet of a compressor, or air-injection pump 30. The compressor 30 is connected to the engine crankshaft pulley 31 by a belt 32 so as to be driven in direct proportion to engine speed, and includes an axially extending inlet conduit 33 through which ambient air is drawn in by the force generated by the compressor. An outlet conduit 34 extends from the compressor 30 to an air distribution manifold 36 which, in turn, is connected by a plurality of short injection tubes 38 to the exhaust manifold 16. The conduit 28 is connected to the compressor outlet conduit 34 in any conventional manner so as to receive a relatively small portion of the air passing from the compressor to the exhaust manifold 36. The pressure of the air entering the conduit 28 is thus influenced by the pressure of the exhaust gases in the manifold 36 due to the communication of the conduit 28 with the latter manifold, via the conduit 34. The air supplied through the conduit 28 to the nozzle 22 from the outlet of the compressor 30 serves to induce the flow of fluid through the conduit 26 and to the nozzle 22 for discharge into the carburetor 12 in a manner to be described. A pair of valves 39 are provided in conduits 26 and 28 to prevent any reverse flow of fluid and air, respectively, from the nozzle 22.

Figure 2:
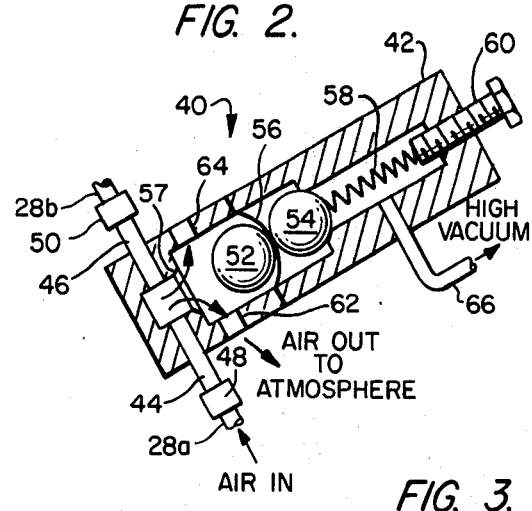
FIG. 2 is an enlarged cross-sectional view of a flow control device used in the system of FIG. 1.

A pressure responsive, air flow control device, shown in general by the reference numeral 40, is connected to the conduit 28 and is better shown in FIG. 2. More particularly, the device 40 consists of a hollow, elongated housing 42 having an inlet conduit 44 and an outlet conduit 46 extending therefrom and communicating with its interior. The conduits 44 and 46 are connected between two portions 28a and 28b of the conduit 28 by clamps 48 and 50, respectively, to permit, under conditions to be described, the flow of air through the conduit 28.

A pair of ball valves 52 and 54 are provided in an enlarged interior portion of the housing 42 and extend to either side of a membrane 56 extending across the latter interior portion and affixed to the housing in a suitable manner. The ball valve 52 moves to and from a valve seat 57 disposed in the interior of the housing 42, and communicating with the conduits 44 and 46.

A spring 58 is disposed in the interior of the housing 42 and extends between the ball valve 54 and an adjustment screw 60 threadedly engaging a threaded bore formed through an end wall of the housing. The screw 60 thus can be rotated to vary its axial position in the housing and thus vary the force of the spring 58 on the ball valve 54.

A pair of openings 62 and 64 are formed through the wall of the housing at a location between the valve seat 57 and the membrane 56 for permitting the bleeding, or discharge, of air from the interior of the housing under conditions to be described. A vacuum conduit 66 extends from the housing 42 at a location between the membrane 56 and the screw 60 and communicates at one end with the interior of the housing and at its other end with the intake manifold 14 (FIG. 1). The membrane 56 is thus urged in one direction by the atmospheric pressure from the openings 62 and 64 and by the vacuum in the intake manifold; and in the other direction by the spring 58.

As a result of the foregoing, during certain operating conditions of the vehicle, such as idle or deceleration, when the vacuum in the intake manifold 14 is relatively high, the force exerted by it, along with the force exerted by atmospheric pressure, are sufficient to overcome the force of the spring 58. Thus, the ball valve 52 will move from the seat 57 as shown in FIG. 2 and permit air from the inlet conduit 44 to pass from the housing 42 out through the openings 62 and 64 into atmosphere. Under these conditions, the pressure in the exhaust manifold is low and the air pressure from the compressor 30 is thus also low. As a result, little, if any, air passes to the conduit portion 28b and to the nozzle 22 and no water is injected.

Figure 3:
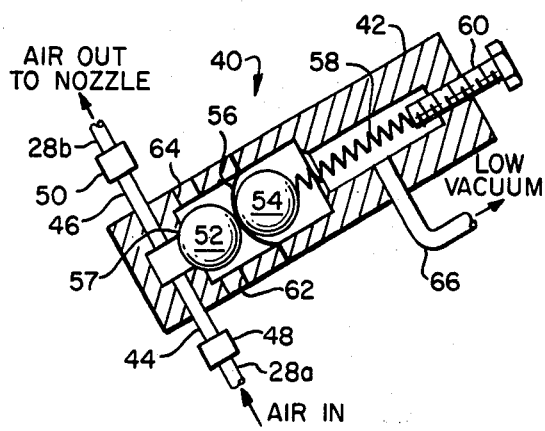
FIG. 3 is a view similar to FIG. 2, but depicting the device of FIG. 2 in a different operational mode.

However, during relatively high load conditions when the vacuum in the intake manifold 14 is relatively low, the spring 58 will overcome the minimal force exerted by the latter vacuum and the force exerted by atmospheric pressure through the openings 62 and 64 acting on the membrane 56, and urge the ball valves 52 and 54 into the position shown in FIG. 3, i.e., where the valve 52 is seated on the seat 57. This blocks air flow to openings 62 and 64, and the air thus passes from the conduit portion 28a, through the inlet conduit 44 and the housing 42, and directly to the outlet conduit 46 for passage into the conduit portion 28b and the nozzle 22 to induce the injection of fluid. Since, during these high load conditions the pressure in the exhaust manifold and, therefore, the air pressure from the pump is relatively high, the air flow from the compressor through the housing 42 and to the hose 28b is at a relatively high pressure, which results in a high flow rate of air, and a resultant fluid injection from the nozzle 22.

The size of the ball valve 52 relative to the interior housing portion in which it moves, and relative to the size and location of the seat 57 and the openings 62 and 64 is such that the relative amounts of air flowing directly from the interior of the housing 42 to the conduit 46 and to the openings 62 and 64 will vary with movement of the ball valve 52 in the interior of the housing 42 in response to variations in the vacuum in the intake manifold 14.

Since the vacuum in the intake manifold is directly proportioned to engine load, and since the air delivered to the nozzle 22 by the compressor 30 through the conduit 28 is in communication, via the conduit 34 with the exhaust manifold 16 containing gases whose pressure also varies in proportion to engine load, it can be appreciated that the flow of air to the nozzle 22, and the resultant injection of water into the carburetor 24, will be in a fairly precise direct proportion to variations in engine load.

A temperature responsive control unit 68 (FIG. 1) is mounted on the surface of the intake manifold 14 adjacent the device 40 and is connected to the compressor 30 as shown by the dashed line. It is understood that the control unit 68 includes a temperature responsive probe or thermostat (not shown) for responding to a predetermined engine temperature for selectively activating and deactivating the compressor 30 in a conventional manner, as will be described.

Figure 4:
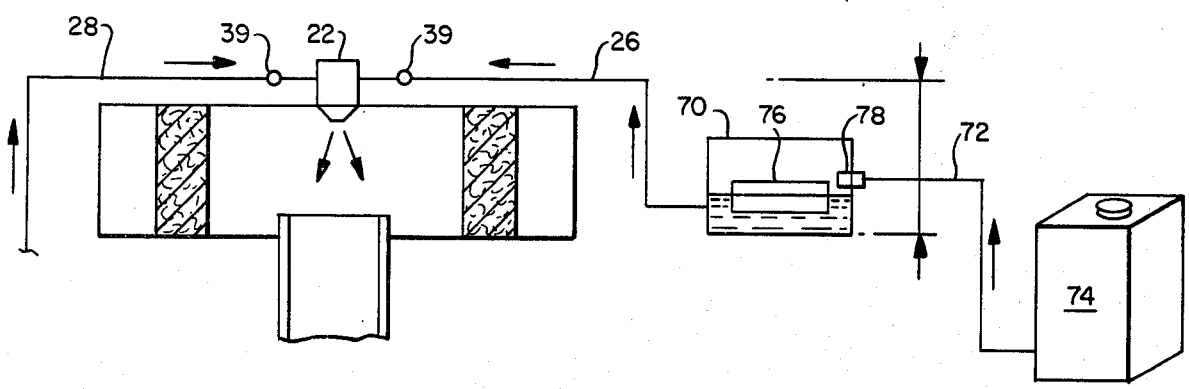
FIG. 4 is a schematic representation of a portion of the fluid injection sytem of FIG. 1.

As shown in FIG. 4, the conduit 26 is connected to a float-bowl reservoir 70 which, in turn, is connected through a supply line 72 to a fluid container 74. The float-bowl reservoir 70 includes a float 76 that operates an inlet valve 78 which can be of the needle valve type, to maintain a uniform level of cooling fluid within the reservoir 70 in a conventional manner. In the preferred embodiment, the fluid is in the form of water, or water in solution with other substances, such as methanol or alcohol, and the container 74 is provided with a pump (not shown) for pumping the fluid to the reservoir 70. Also, the float 76 is located at a selected elevation below the elevation of the nozzle 22 to prevent the fluid from unintentionally flowing under the influence of gravity to and through the nozzle 22. The reservoir 70, while not necessary to the operation of the system of the present invention, permits the supply container 74 to be located remotely from the engine 10 at a convenient elevation relative to the nozzle 22.

Figure 5:
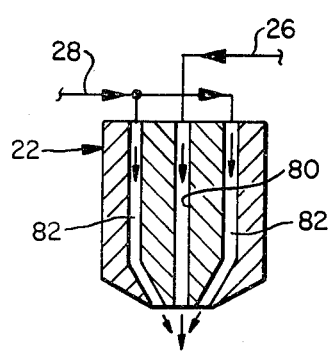
FIGS. 5 and 6 are cross-sectional views of two exemplary fluid injection nozzles suitable for use with the system of the present invention.
Figure 6:
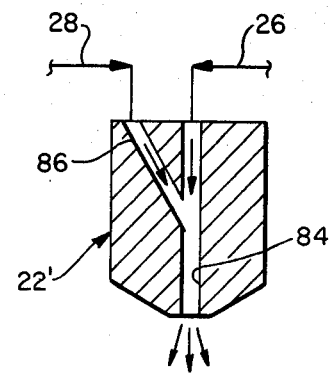

The nozzle 22 is adapted to provide a downwardly directed and preferably diverging flow of finely divided fluid droplets in response to the flow of air through the nozzle. While many different types of nozzles are suitable for use with the present invention, the nozzle 22 of the type shown in FIG. 5 is preferred which includes a central bore 80 for receiving the fluid from the conduit 26 and a plurality of circumferentially arranged atomizing air supply bores 82 for receiving air from the conduit 28 and for directing the flow of air to the outlet of the bore 80. The flow of air past the outlet of the bore 80 creates a low pressure zone which induces, or draws, fluid from the hose 26 through the bore 80 in a conventional manner, where it is mixed with, and atomized by, the air passing into the inlet 24 of the carburetor 12. In the alternative, a nozzle 22' of the type shown in FIG. 6 may be provided which has a central bore 84 connected to the fluid supply conduit 26 and an air-injection bore 86 connected to the air supply conduit 28 that opens into the central bore 84 at an acute angle to effect the induction and atomizing function.

In operation, upon starting the engine, the compressor 30 will be driven by the belt 32 in direct proportion to engine speed to draw in ambient air through the inlet conduit 33 where it is pressurized and passed, via the conduit 34 to the exhaust manifold 16 and, via the conduit portion 28a, to the inlet 44 of the flow control device 40. During idle conditions of the vehicle the relatively high vacuum that exists in the intake manifold 14 is communicated, via the vacuum conduit 66, to the interior of the housing 42 of the flow control device 40. This, plus the effects of the atmospheric pressure from the openings 62 and 64 acting on the diaphragm 56, will move the ball valves 52 and 54 against the force of the spring 58 to the position shown in FIG. 2 so that the air, which is at relatively low pressure due to the aforementioned communication of the conduit 28 with the exhaust manifold is bled from the openings 62 and 64 into atmosphere. Thus, the conduit portion 28b, and therefore the nozzle 22, will receive no air and the nozzle will not inject any fluid into the carburetor 24.

As load conditions increase the vacuum in the intake manifold decreases until the force of the spring 58 is greater than the combined forces of the latter vacuum and the atmospheric pressure acting on the membrane 56. At a predetermined, relatively high load condition, the ball valve 52 engages the seat 57 and thus blocks flow through the passages 62 and 64, permitting the flow of air directly through the housing 42 and to the outlet conduit 46 for introduction to the nozzle 22 via the conduit portion 28b. Since the conduit portion 28a is in communication with the exhaust manifold 16 via the conduit 34, and since the pressure of the exhaust gases in the latter manifold are relative high under these high load conditions, the pressure of the air introduced to the nozzle 22 will be relatively high, thus insuring a positive flow of air through, and injection of fluid from, the nozzle.

Of course, during normal driving conditions, the ball valves 52 and 54 will move between the two extreme positions depicted in FIGS. 2 and 3 in response to variations in engine speed by virtue of the connection of the compressor 30 to the crankshaft pulley 31, and to variations in engine load as discussed above.

As indicated above, the control unit 68 operates to deactivate the compressor 30 under selected temperature conditions of the engine 10. More particularly, the compressor 30 is deactivated by the control unit 68 during cold starts, and continues in this mode until the engine temperature reaches a preselected value at which time it functions to place the compressor in the activated state as described above.

It is apparent from the foregoing that the fluid injection system of the present invention operates only at times which are optimum as determined by the critical operating modes of the engine. Also, since the volume of air passing through the nozzle 22 is relatively high compared to the volume of fluid, a very precise metering of the fluid is obtained.

As a result of the foregoing, detonation, knock and ping and the production of nitrous oxides are substantially eliminated since the fluid lowers the combustion temperatures below the point where they normally occur. This plus the added power obtained as a result of the expansion of the water as it turns to steam results in a dramatic increase in engine efficiency.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder, and V-8 engines. Also, the present invention is not limited to use with engines having a carburetor for mixing air and fuel but can easily be adapted to fuel injection and stratified charge engines by directing the cooling fluid directly into the cylinder of the engine through an appropriate inlet. Also, although reference has been made to the terms "cooling fluid", "water", and "water in solution", it is understood that other types of fluids can be injected that affect the combustion process, such as octane improvers, anti-detonates, and oxygen additives, etc.

Still other variations in the foregoing can be made within the scope of the invention. For example, reference has been made to the use of conduits to connect the various components in fluid flow communication, it being understood that this would include hoses, tubing, pipes, etc. Also, the control device 40 can be connected to the inlet side of the compressor 30 rather than to the outlet side, as disclosed above, with the design of the device being changed as necessary. Further, a demand regulator, or the like, can be provided in place of the float-bowl reservoir 70 to provide the fluid to the hose 26, and the position and location of the nozzle 22 can be varied as long as it is effective to introduce the fluid into the intake air side of the engine 10. Still further, other types of valves other than the ball valves 52 and 54 can be used.

As also will be apparent from those skilled in the art, still other changes and modifications may be made to the water injection system of the present invention without departing from the spirit and scope of the invention and recited in the appended claims and their legal equivalent.

What is claimed is:

1. A system for injecting fluid into a cylinder of an internal combustion engine, said system comprising fluid injection means for introducing air to said fluid for injecting said fluid into said cylinder at a rate proportional to the flow of said air, means for supplying pressurized ambient air to said fluid injection means, control means in a responsive relation to the intake manifold of said engine for controlling the flow of air to said fluid injection means in response to pressure variations in said intake manifold, and means for varying the pressure of said air to said fluid injection means in response to pressure variations in the exhaust manifold of said engine.

2. The system of claim 1 wherein said air supplying means comprises a compressor and means for connecting said compressor to said fluid injection means.

3. The system of claim 2 wherein said fluid injection means comprises a nozzle connected to a source of fluid and to said connecting means, said nozzle including fluid and air flow passages formed and arranged in a manner to draw said fluid from a supply of fluid and through said fluid flow passage in response to the flow of air through said air flow passage.

4. The system of claim 3 wherein said fluid and air flow passages are further formed and arranged to mix said fluid and air upon their discharge from said nozzle.

5. The system of claim 2 wherein said pressure varying means comprises means for connecting said compressor to said exhaust manifold.

6. The system of claim 5 wherein said compressor supplies a portion of said pressurized ambient air to said exhaust manifold.

7. The system of claim 5 wherein said means connecting said compressor to said exhaust manifold comprises a conduit.

8. The system of claim 7 wherein said means for connecting said compressor to said fluid injection means comprises an additional conduit connected to said first conduit.

9. The system of claim 8 wherein said control means is connected to said additional conduit.

10. The system of claim 1 wherein said control means varies the flow of air to said fluid injection means in proportion to said pressure variations in said intake manifold.

11. The system of claim 2 wherein said control means comprises a housing connected to said connecting means, means extending from said housing into said intake manifold for communicating the pressure in said intake manifold to the interior of said housing, means establishing a direct passage through said connecting means and said housing for the air from said compressor, means defining at least one bleed passage for said air through said housing, valve means for controlling the flow of said air through said direct air passage and said air bleed passage, pressure responsive means in said housing for controlling the movement of said valve means and, therefore, the relative flow of said air through said direct air passage and said air bleed passage in response to pressure variations in said intake manifold.

12. The system of claim 11 wherein said valve means comprises at least one valve movable to and from a seat formed in said housing and a membrane extending across the interior of said housing.

13. The system of claim 12 wherein said pressure responsive means comprises means including a spring for exerting a force on one surface of said membrane and means for varying the magnitude of said force.

14. The system of claim 13 wherein the other surface of said membrane is exposed to atmospheric pressure via said bleed passage and to air pressure via said direct passage.

15. The system of claim 12 wherein said valve moves in the interior of said housing to vary the effective size of said bleed passage and, therefore, said relative flow.

16. The system of claim 11 wherein said housing has an air inlet and an air outlet connected to said connecting means.

17. The system of claim 2 further comprising a temperature sensor responsive to the temperature of said engine and connected to said compressor for deactivating said compressor in response to the temperature of said engine being below a predetermined value.

18. The system of claim 2 further comprising means for driving said compressor in direct proportion to the speed of said engine.

19. A system for injecting fluid into a cylinder of an internal combustion engine comprising first means communicating with the exhaust gases from said engines for responding to the pressure of said gases, second means communicating with the intake manifold of said engine for responding to the vacuum in said intake manifold, a compressor for supplying pressurized ambient air, and a nozzle connected to said compressor for receiving air and introducing air to said fluid to inject said fluid into said cylinder at a rate proportional to the flow of air, said nozzle being in a cooperative relation with said first and second means for injecting fluid into said cylinder in proportion to the pressure of said exhaust gases and the vacuum in said intake manifold.

20. The system of claim 19 further comprising means for driving said compressor in direct proportion to the speed of said engine.

21. The system of claim 19 wherein said first means connects said conduit to said exhaust manifold.

22. The system of claim 20 wherein air from said compressor passes to said nozzle and to said exhaust manifold, the flow of air passing from said compressor to said nozzle varying in response to variations in pressure in said exhaust manifold.

23. The system of claim 19 wherein said second means includes a vacuum switch for controlling the flow of air through said conduit in response to variations in said intake manifold vacuum.

* * * * *